United States Patent [19]
Bernard

[11] 3,954,654
[45] May 4, 1976

[54] TREATMENT OF IRRADIATED NUCLEAR FUEL

[75] Inventor: Claude Bernard, Louveciennes, France

[73] Assignee: Saint-Gobain Techniques Nouvelles, Courbevoie, France

[22] Filed: May 17, 1974

[21] Appl. No.: 471,063

[30] Foreign Application Priority Data
May 18, 1973 France .............................. 73.18073

[52] U.S. Cl. .................... 252/301.1 W; 423/4; 423/8; 423/20; 423/249
[51] Int. Cl.² ................ C09K 11/04; C22B 60/04; C22B 60/02; C01B 5/02
[58] Field of Search .............. 423/4, 8, 10, 20, 580, 423/249; 252/301.1 W

[56] References Cited
UNITED STATES PATENTS

| | | |
|---|---|---|
| 3,706,630 | 12/1972 | Cohen et al. ............. 252/301.1 W X |
| 3,808,320 | 4/1974 | Kaiser et al. ............................. 423/4 |
| 3,825,649 | 7/1974 | Gresky et al. ............................ 423/4 |
| 3,842,155 | 10/1974 | Muller et al. ...................... 423/20 X |

OTHER PUBLICATIONS
Yarbro et al., N.S.A., 26, Abs. No. 38406 (Aug. 1972).
Ornl, N.S.A., 25, Abs. No. 2314 (Jan. 1971).

Primary Examiner—Benjamin R. Padgett
Assistant Examiner—E. A. Miller
Attorney, Agent, or Firm—Pennie & Edmonds

[57] ABSTRACT

After a first extraction of an aqueous nitric acid solution of spent nuclear fuel by a suitable organic solvent and a first washing of the resulting organic phase by an aqueous solution to remove tritiated water, the organic phase is submitted to a second washing with a volume of dilute aqueous solution of nitric acid free from tritium, said volume being substantially smaller than that of the organic phase, whereby the organic phase is rendered substantially tritium-free and contamination by tritium in the following stages of the process is avoided.

8 Claims, 1 Drawing Figure

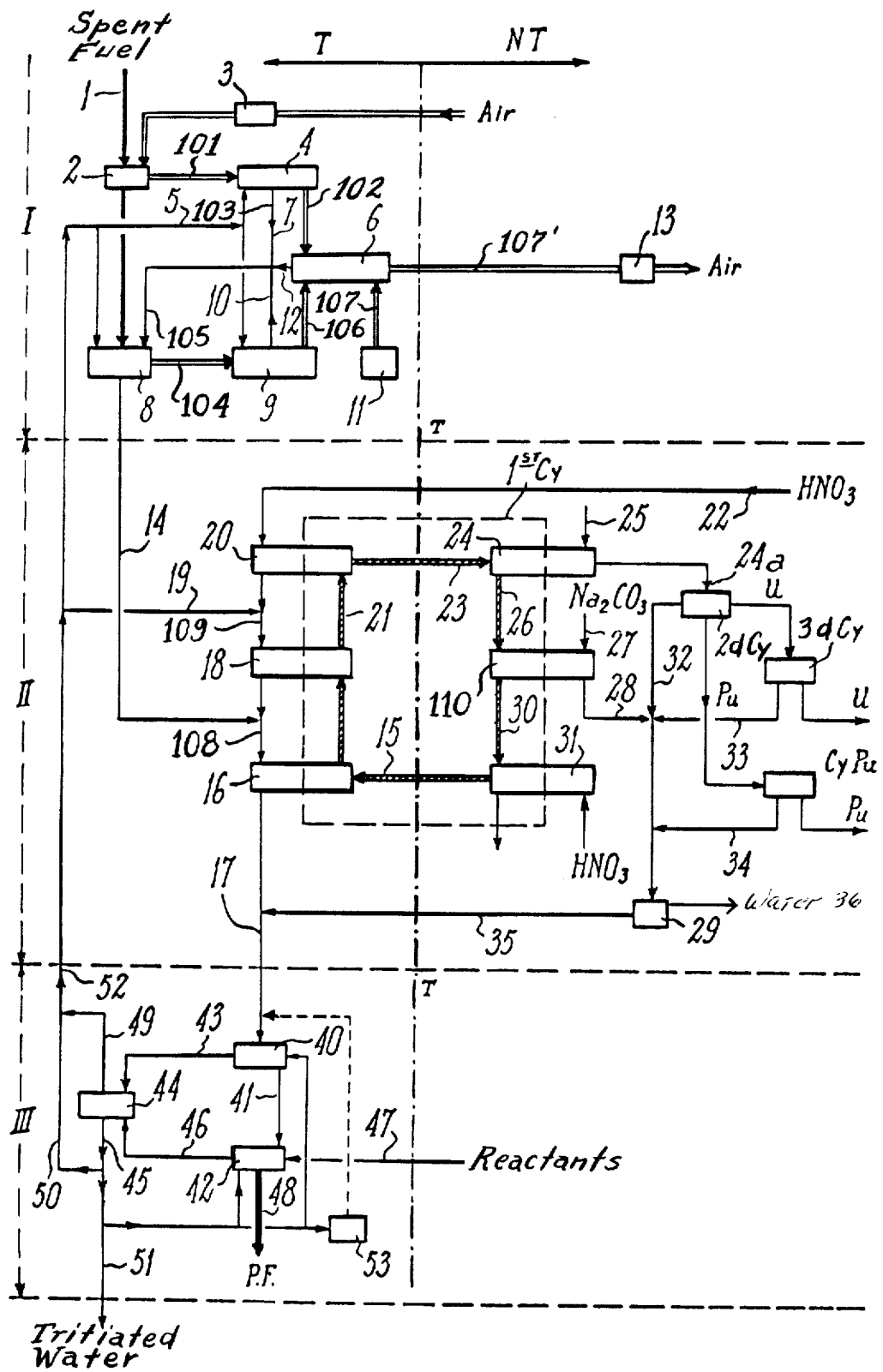

TREATMENT OF IRRADIATED NUCLEAR FUEL

The present invention relates to a process for separating tritium from spent irradiated nuclear fuel in which process the fuel is first dissolved in aqueous nitric acid, after which the resulting solution is subjected to extracting and washing operations.

It is an object of the present invention to provide a process for separating tritium from spent irradiated nuclear fuels removed from a reactor which will limit to low levels the tritium escaping to the environment and which permits recovery of the tritium for use.

The quantities of tritium contained in spent nuclear fuels are such that it is no longer possible simply to release them to the environment, on account of the pollution which would result therefrom. In fuels based upon uranium oxide, the tritium appears in the form of tritiated water.

It has already been proposed in the United States to effect a process called "voloxidation", intended to separate the tritium before dissolving the spent fuel in aqueous nitric acid. In this process the spent fuel rods, cut into sections, are roasted at 400°C. for four or five hours in a stream of oxygen. Under these conditions the major portion of the tritium, which is present in the form of tritiated water, is eliminated in the current of scavenging gas which in turn must be treated. As to the uranium oxide, it is transformed from $UO_2$ into $U_3O_8$ which is easy to dissolve.

This process has various shortcomings, in particular because it depends upon a gas-solid reaction which makes it necessary to provide a reactor vessel capable of containing a large amount of uranium, of the order of one ton for a large plant.

There is also a danger of fire from debris or fragments of the material used to sheath the fuel rods, particularly when they contain certain alloys such as zircalloy, by reason of the high temperature and oxidizing atmosphere which prevail.

Lastly, this voloxidation process requires the handling of a large volume of gas resulting from roasting of the nuclear fuel, further increased by the gas required for ventilation of the shearing mechanism since part of the tritium is liberated in the shearing process.

It is an object of the invention to surmount these shortcomings. The invention therefore provides a process for separating tritium in a plant for the treatment of spent fuel elements in which:

1. After shearing into fragments, the fuel elements are dissolved in nitric acid.
2. The solution thus obtained is extracted by a suitable solvent which is thereafter washed by an aqueous solution of nitric acid. There is thus obtained an aqueous phase containing tritiated water and the major portion of the fission products and, in addition, an organic phase containing uranium, plutonium and a small proportion of fission products.
3. Simultaneously or separately there are extracted the uranium and the plutonium in aqueous phases which are treated in subsequent extraction cycles for separation of the uranium, plutonium and residual fission products.
4. The organic phase is treated to purify it prior to recycling, the first step in which treatment may consist of a washing with a sodium carbonate solution and subsequent steps being optional alkaline and acidic washings.
5. The various fractions containing fission products are then treated in order to concentrate at least the most active ones and optionally to solidify them, the tritiated water and the nitric acid being thereby separated for recycling in the plant.

The process is characterized by the fact that after a preliminary extraction and dissolution of the irradiated fuels and an initial washing of the organic phase obtained in this extraction, the washing being effected with aqueous nitric acid solutions containing tritiated water, the organic phase is subjected to a second washing with an aqueous solution of nitric acid which is free of tritium and the amount of which solution involved is substantially lower than that of the organic phase, all for the purpose of re-extracting the tritiated water dissolved in the contaminated solvent so as to avoid contamination with tritium in the subsequent stages of the process.

According to one feature of the invention, the quantity of nitric acid solution free of tritium is desirably of the order of 1/100th the volume of the organic phase. This ratio may however vary from an average value therefor by a factor between 1 and 3.

According to another feature of the invention, the quantity of water which must be introduced into the part of the plant containing tritiated products is reduced by use of anhydrous and/or concentrated reactants.

According to still a further feature of the invention, the excess water to be eliminated from the cycle under tritiated conditions is adjusted as a function of the quantity of tritium present. Advantageously, this water is removed by a process of rectification from the nitric acid solutions.

BRIEF DESCRIPTION OF THE DRAWING

In the drawing, the single FIGURE of drawing is a schematic flow diagram of a plant for the treatment of spent fuels in accordance with the invention and wherein the process of the invention may be practiced.

DESCRIPTION OF PREFERRED PRACTICE OF THE INVENTION

In the drawing, the heavy full lines represent the flow of solids. Double, cross-hatched lines represent the flow of the organic phase in the first extraction cycle. Double lines without cross-hatching represent the flow of gas, and light full lines represent the flow of the aqueous phases.

In the drawing, the plant in which the process of the invention is practiced may be regarded as divided into a tritiated zone T and a non-tritiated zone NT, separated in the drawing by a dot-dash vertical line. It is in the tritiated zone at the left that are carried out the operations pertaining to the separation of tritium.

These operations may be divided into three groups I, II and III as indicated in the drawing.

Group I. This group includes the shearing or cutting operations performed on the fuel elements and the dissolution thereof. These operations produce an effluent gas from which the tritium must be eliminated before that gas is released to the atmosphere.

Group II. This group includes the extraction operations for uranium and plutonium, carried out with the help of an organic solvent comprising a solution of about 30% tributylphosphate in a diluent such as dodecane. In the course of these operations several liquid-liquid extraction cycles are carried out which make it possible to isolate the salts of uranium and plutonium in decontaminated form, i.e. free of fission products.

Group III. This group comprises the operations for treatment of the fission products with recovery of tritiated water and nitric acid.

Applicant has found that it is possible to reduce as much as desired the quantity of tritium contained in the charged solvent which is obtained in the first cycle of extraction operations. To obtain this result, the solvent containing uranium and plutonium salts and a part of the tritium is washed with an aqueous solution of nitric acid free of tritium. The loaded solvent subjected to the washing operation in accordance with the invention comes from the extraction of the solution of nitrates of spent fuel by means of the organic solvent, followed by a washing with low concentration tritiated nitric acid.

The washing according to the invention with a non-tritiated nitric acid solution whose volume amounts to approximately 1/100th of the volume of organic solvent is carried out in an extractor having five stages. This is sufficient to reduce the quantity of tritium escaping in secondary residual products to about 1% of the quantity initially present.

Nevertheless, given the low quantity of this aqueous washing solution relative to the quantity of solvent, it is desirable to create in each of the subsequent stages a constant recycling of the aqueous phase from the decantation toward the mixer in order to maintain in the latter comparable volumes of the two liquid phases and hence to maintain good contact between them.

In other words, the process according to the invention resides in creating in the first extraction stage (in Group II, in the drawing) a barrier for the tritium and in keeping the major portion of the installation, especially the subsequent extraction cycles, free of tritium, and in recovering at the output of the stages for separation of fission products a tritiated nitric acid which is recycled in the tritiated portion of the plant but from which, by rectification, a certain quantity of tritiated water is removed, which in turn will be withdrawn from the plant in the Group III portion thereof.

For ease in treatment, it is desirable that this quantity of water withdrawn be small. It may be preserved or purified and freed from tritium by an isotopic separation process, down to the tolerance level permitted by prevailing standards before being released to the environment. These last operations do not form part of the invention and will not be described.

It is hence important in the process of the invention to reduce the excess of tritiated water which is to be withdrawn from the cycle.

It is thus desirable for example to reduce this excess of water to a volume of the order of 300 liters, for a quantity of spent fuel at the input to the plant corresponding to approximately one ton of irradiated uranium. It would, however, not be desirable to reduce much further the excess water so withdrawn, because the result of so doing would be a substantial accumulation of tritium in the tritiated portion of the plant, which would constitute a risk and which would make it necessary to increase the effectiveness of the tritium barriers applicable to the solvent in the first cycle, and to the gases escaping from the installation.

In order to reduce to the previously described level (300 liters per ton of uranium) the excess of tritiated water to be withdrawn, the additions of water to the plant are reduced in accordance with the invention in one or more of the following ways:

a. Firstly, reactants are introduced into the tritiated portion of the plant in an anhydrous or highly concentrated state. This measure entails the suppression of certain highly aqueous reactants such as formaldehyde which is sometimes utilized to destroy the nitric acid in the course of concentration of fission products.

b. The nitric acid necessary for dissolution of the spent fuel is introduced in the form of anhydrous nitrous fumes which are caused to be absorbed in the tritiated water in circulation in the plant.

c. The nitric acid necessary for the dissolution of the spent fuel is treated in the form of super-dehydrated complexes by a solvent extraction from normally concentrated acid. There is then advantageously used the solvent employed for extraction in the first cycle.

d. After renewed extraction of the uranium and plutonium and before recycling the solvent, the latter is treated in conventional fashion with alkaline washings to eliminate the degradation products which have been formed. The carbonated solution resulting from the first washing of the solvent is usually strongly radioactive and it is often provided that this solution will be mixed with the aqueous solution which comes from the first extraction cycle and which contains the major fraction of the fission products. To reduce the corresponding makeup water to be added, it is instead provided in accordance with the invention to mix this carbonated solution with the effluents of other extraction cycles (which effluents contain a major portion of the residual fission products after the first extraction cycle) so as to concentrate this solution as much as possible with these effluents. The concentrate obtained is then combined with the effluents of the first cycle. The distillate can be used in the non-tritiated portion of the plant.

e. The vapor necessary for operation of the steam ejectors which serve to transfer the tritiated solutions is produced from recycled tritiated water or by recompression of water vapor collected at the output of the rectification column for tritiated nitric acid separated from fission products after its recycling.

It is also appropriate, in order to prevent all rejection or release of tritium into the environment, to treat the gases issuing from the shearing station, from the installation for dissolution of spent fuels, and from various other portions of the plant because all these gases may contain tritiated water vapor. To this end these gases are subjected to a dehydration before rejection to the atmosphere. The tritiated water thus recovered is returned to the cycle of the plant.

It may be likewise advantageous, prior to the above-mentioned dehydration, to subject the ventilating gases from the shearing station to a washing with part of the nitric acid intended for dissolution of the spent fuel.

Referring now to the drawing, the principal operations effected in a plant for the practice of the invention are illustrated. Practice of the invention will be described in terms of a quantitative example which however constitutes in no sense a limitation on the scope of the invention. The values given depend in part upon presently available apparatus types and upon presently applied safety standards. Other values are entirely compatable with the invention.

EXAMPLE

This example describes the operations carried out in accordance with the invention in a plant for treatment of spent fuel. The fuel comes from light water reactors, and comprises rods of slightly enriched uranium jacketed with zircalloy which have been subjected to 33,000 megawatt-days of irradiation per ton.

In this plant the purified uranium and plutonium are recovered in the form of uranyl nitrate and in the form of plutonium nitrate. This mode of operation has an effect on the excess of water produced and on the mode of introduction of the nitric acid necessary for dissolution of the fuel. In fact if the products resulting from operation of the plant were to be delivered in the form of oxides by denitration, it would be possible to effect absorption of the nitrous vapors by the tritiated water for complete recycling of the nitric acid. It is however easier to effect this introduction in the liquid phase.

Moreover, the fission products initially separated in the form of nitric acid solutions are thereafter preserved in the solid state, for example after vitrification. Their solidification permits recovery of the nitric acid and water.

The quantity of tritium present in the fuel at input depends upon the irradiation level in the reactors from which the fuel comes and upon the extent of diffusion of tritium through the fuel rod jackets. However when the jackets are of zircalloy, as assumed, the major portion of the tritium formed is still present at the input to the fuel treatment plant. The maximum quantity of tritium present may be calculated as 700 Curies (hereinafter Ci), i.e. 71.5 milligrams of tritium, per ton of uranium in the case of fuel irradiated as above indicated to the extent of 33,000 megawatt-days per ton.

It is assumed that in fuels in the form of oxides, the tritium is present essentially in the form of tritiated water.

In this example the quantity of non-bound tritium (molecules of the gas $T_2$) is of the order of the permissible losses as hereinafter defined. The tritium present in this form may, if desired, be oxidized and trapped in the form of water. The barriers or other systems for retaining tritium have been designed so that the total losses of tritium from the tritiated zone (apart the excess of tritiated water) shall be of the order of one or two percent of the initial quantity of tritium.

Lastly, the reactants utilized in the tritiated zone are introduced in anhydrous form and they are thereafter optionally diluted with the recovered tritiated water.

There will hereinafter be given the details of the operations carried out in the three portions Group I, Group II and Group III of the plant of the drawing. The numerical values hereinafter given are with reference to 1 ton of uranium entering the plant, the plant being, for example, capable of treating 6 tons per day.

Considering now the drawing, the spent fuel which enters the plant at line (i.e. conduit) 1 contains, for 1 ton of uranium, about 10 kilograms of plutonium and 29 kilograms of fission products of which 71.5 mg. or 700 Ci. may be tritium.

Group I

In the "Group I" portion of the plant, the arriving spent fuel rods are cut with a shear into short lengths. The enclosure 2 for the shear is swept with a current of gas (air or nitrogen) which can amount to 1000 cubic meters per ton of uranium.

Upon emerging from the shearing enclosure 2 this gas carries tritiated water and possibly some free tritium both evolved during the shearing operation. The quantity so set free depends upon the nature and temperature of the fuel and on the length of the cut fuel rod lengths. It is supposed here that 50% of the tritium present or 350 Ci. will be set free at the time of shearing.

The scavenging gas passes via line 101 into a washing column 4 in which the dusts carried by the gas are dissolved and the tritiated water vapor is partially condensed and diluted in acidulated water 5 coming from "Group III" portion of the plant. At the gas outlet 102 from this washing column the scavenging gas from the shear contains a certain amount of tritiated water vapor which will be held back at tritium trap 6.

The acidulated washing water 7 emerging from the column 4 at 103 is used as a makeup fluid for the dissolution of the fuel. Dissolution of the fuel at 8 is carried out with the help of nitric acid and results in the formation of nitrates, of water and of nitrous vapors. Among the possible reactions there will be considered the following as the sole one taking place since it is the one that consumes the most acid:

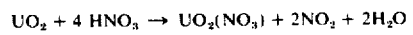

$$UO_2 + 4 HNO_3 \rightarrow UO_2(NO_3)_2 + 2NO_2 + 2H_2O$$

Under these conditions a total of 1235 kilograms of $HNO_3$ are required per ton of uranium. Of this quantity the equivalent of 696 kilograms will permanently leave the tritiated zone in the form of $UO_2(NO_3)_2$ and of $HNO_3$ complexed with tributylphosphate (TBP) of the charged solvent, to be described presently.

The nitrous vapors coming from the dissolution step at 8 pass via line 104 to an "off gas" unit 9 where they are absorbed in the recovered water. The nitric acid thus formed is returned via lines 10 and 105 to be reused in the dissolution process. The gases emerging from the unit 9 are sent via line 106 to the tritium trap 6.

The trap 6 receives in addition gases coming via line 102 from the washing device 4 and effluent arriving via a line 107 from various portions of the tritiated zone, schematically indicated at 11.

The tritium is present in these gases primarily in the form of tritiated water. The trapping of tritium amounts to condensation of this water vapor in a cold trap. The quantity thus condensed amounts to about 200 liters of water containing 830 Ci. of tritium. Less than 5 to 10 Ci. of tritium are carried by the gases which emerge from the tritium trap. If a higher level of trapping is required there may be added to the trap 6 better desiccating means such as silica gel or molecular screens. Likewise if no escape of tritium from the trap is to be tolerated, it is possible to oxidize the tritium and to trap the water resulting from that operation.

At the outlet from the tritium trap 6 the gases pass via line 107' to the non-tritiated zone where they are treated at 13 for elimination of the other fission gases prior to rejection to the atmosphere.

The condensed water is returned via lines 12 and 105 to the dissolving unit 8.

It will thus be observed that substantially the entire quantity of tritium entering the plant is directed via line 14 to the "Group II" portion thereof in the aqueous solution resulting from the fuel dissolving step.

Group II

In the Group II portion of the plant the apparatus employed, such as mixer-settlers, pulsed columns or centrifuge type extractors, is well known and need not be described in detail.

The operations in this Group comprise notably the first extraction cycle. This has for its object a separation, by extraction with the aid of an organic solvent, of the uranium and plutonium from the majority of the fission products which remain in the aqueous nitric acid phase.

As a solvent there is employed tributylphosphate diluted to 30% in a diluent such as dodecane. The quantity of this solvent amounts approximately to 11,100 liters per ton of uranium or about double the total volume of the aqueous phase.

In the first extraction cycle the aqueous phase is delivered via lines 14 and 108 to a counter flow device 16 where it is contacted with the organic phase arriving via line 15.

The aqueous phase is introduced between the extraction section proper 16 (from which there emerges on line 17 a nitric acid solution containing fission products) and a washing section 18 whose function is to re-extract so far as possible the fraction of the fission products carried along in the output from extractor 16 by the organic phase, where it contains about 90 grams per liter of uranium and also the plutonium.

This washing section 18 is fed with 2 to 3 N nitric acid via lines 19 and 109 at a rate amounting to about one-fifth that of the organic phase. This acid, coming from the rectification in the Group III part of the plant, possesses consequently a certain ingredient of tritium, about 25 Ci per kilogram of hydrogen.

The organic phase captures a portion of the water and of the nitric acid, which it carries with it at the output on line 21 from the washing section 18. The quantity of tritium carried along in this way depends on the proportion of tritium in the aqueous phase and hence on the proportions of water and nitric acid supplied from line 19. It varies however inversely with the concentration of uranium in the solvent. In the present case the quantity of tritium carried along is of the order of 170 Ci. The isotopic exchange of tritium with the hydrogen atoms of the organic solvent has been proved to be negligible.

The operation which involves the characteristic feature of the invention is schematically indicated at 20. This operation comprises a washing of the loaded organic phase with a small quantity of fresh, non-tritiated nitric acid solution supplied at line 22. For this purpose the device 20 may comprise a succession of mixer-settlers stages. The aqueous phase output from the washing and the number of stages will be functions of the degree of purification desired.

In order not to disturb the conditions for extraction of uranium and plutonium, the washing solution should have an acidity close to that of the initial washing, i.e. of the solution arriving on line 19. In the present case there are employed 110 liters of 3 N nitric acid containing 21 kilograms of $HNO_3$ per 100 kilograms of water. In order to reduce the entrainment of tritium by the organic phase to a level below 10 Ci, there is employed a number of washing stages between 5 and 10, according to the efficacity of the mixer-settlers devices.

The loaded solvent emerging on line 23 from mixer-settlers 20 and passing out of the tritiated zone contains accordingly less than 10 Ci of tritium, about 140 kilograms of nitric acid, and about 40 kilograms of water.

The loaded solvent is next sent to the re-extraction installation 24. In this device the loaded solvent encounters an aqueous phase supplied from line 25, of low acidity, in a new series of liquid-liquid extraction phases. The uranium and the plutonium pass into the aqueous phase via line 24a along with part of the residual fission products. These fission products are subsequently recovered in the aqueous effluents emerging from the second and third extraction cycles, and they are then concentrated. These second and third cycles are indicated on the drawing at "2d Cy" and "3d Cy" respectively. These cycles will not be described here in detail. It will be sufficient to indicate that the effluents appearing on lines 32 and 33 from the second and third cycles and likewise the effluent on line 34 from the plutonium treatment, and the effluent on line 28 from the first solvent treatment are concentrated in an evaporator 29. The concentrate emerging on line 35 from this evaporator, which contains the major portion of the residual activity (i.e. fission products not separated at the first cycle), is returned to the tritiated zone T where, with the other fission products, it is treated in the Group III part of the plant. In the present case the concentrate contains 68 kilograms of $HNO_3$ and 85 kilograms of water. The distillate 36 may be partly recycled.

At the output from the re-extraction device 24 the organic phase in line 26 still contains part of the fission products together with degradation products of the solvent, of which it is freed by several washings with aqueous phases of diverse chemical nature.

In the present case the first treatment is carried out with a solution of sodium carbonate supplied to a washer 110 from line 27. By reason of its high activity it is desirable to treat the effluent product on line 28 with the sum of all of the fission products. For this reason this effluent is combined with the outputs of the second and third cycles, in lines 32 and 33 and 34, and is concentrated in the evaporator 29 so as to reintroduce it at minimum volume into the tritiated zone, on line 35. It is possible to use several similar washing steps, which are note shown on the drawing. The treated solvent on line 30 then passes into a nitric acid extractor 31 which constitutes an important feature of the invention.

The quantity of nitric acid consumed in tritiated zone is of the order of 700 kilograms, per ton of uranium treated. The direct use of 14.6N nitric acid would entail the simultaneous introduction into the cycle of 310 kilograms of water which would be added to the excess water computed here below in the description of the Group III part of the plant.

To limit the addition of water, it is preferred, according to the invention, to introduce the nitric acid from concentrated $HNO_3$ by extraction with the aid of the solvent used in the first extraction cycle.

The acidity which the organic phase takes on varies with the acidity of the aqueous phase in equilibrium therewith. In the present case, the nitric acidity of the aqueous phase in equilibrium at the output must be held between 4N and 5N (4.2N, for example) in order to make possible introduction of the required quantity of acid. Equilibrium between the phases may be achieved in a liquid-liquid extraction device similar to those hereinabove mentioned.

In order to maintain the acidity at the desired value therefor, it is, for example, possible to feed the extraction device 31 with 800 liters of 14.6N nitric acid per ton of uranium. The volume of the aqueous phase at the output of this device (again, per ton of uranium) will then be of the order of 485 liters of nitric acid diluted to 4.2N (130 kilograms of $HNO_3$). This acid is used again in the non-tritiated part of the plant.

At the outlet from the extraction device 31 the organic phase on line 15, which contains about 607 kilograms of $HNO_3$ and 50 kilograms (hereinafter kg) of water, is returned to the extraction section 16 in the tritiated zone. The nitric acid then passes in large part into the aqueous phase and is sent with the fission products toward the Group III part of the plant, from which it will be recycled.

Water Computation in passage toward the non-tritiated zone NT:
Water entering into the tritiated zone:

| | |
|---|---|
| In the tritium washing solution on line 22 | 100 kg |
| In the organic phase on line 15 | 50 kg |
| In the concentrate on line 35 | 85 kg |
| Total | 235 kg |
| Water emerging from the tritiated zone on line 23 | 40 kg |
| Difference flowing toward the tritiated zone | 195 kg |

Nitric Acid Computation
Nitric acid introduced into the tritiated zone:

| | |
|---|---|
| On line 22 | 21 kg |
| On line 15 | 607 kg |
| On line 35 | 68 kg |
| Total | 696 kg |

Group III

The 29 kg of fission products present in the fuel at the entry to the plant are found in the approximately 4.5N nitric acid solution delivered from the first extraction cycle on line 17, and in the concentrate on line 35 of the effluents from the other Group II cycles.

This nitric acid solution is concentrated by evaporation in an evaporator 40. There results a concentrated solution of fission products on line 41, which is sent to the solidification unit 42, and a decontaminated distillate on line 43 which contains a large part of the original nitric acid. This distillate feeds the nitric acid rectification unit 44.

The concentrate on line 41 is a nitric solution of nitrates. The solidification process carried out in unit 42 by calcination, vitrification, etc. liberates the water and nitric acid contained in this solution. The nitrates are likewise destroyed and the nitrous vapors produced are re-combined in the form of nitric acid. The water and acid emerging on 46 are sent to the acid rectification unit indicated at 44.

The necessary reactants are introduced on line 47 in anhydrous form so far as possible, and may be diluted with the help of recovered tritiated water. 135 kg of water are thus recycled toward the solidification unit 42.

Likewise the evaporator unit 40 utilizes a certain quantity of water to facilitate distillation of the nitric acid. A certain proportion of the tritiated water, whether in liquid or vapor form, is hence recovered in the rectification unit 44 and is continuously recycled within the Group III part of the plant. The solids obtained are delivered at 48. The water and nitric acid coming from the concentration and solidification units 40 and 42, tritiated but relatively free of other fission products are treated in rectification unit 44, which, by fractional distillation produces 11N nitric acid on line 49 and tritiated water of low acidity on line 45. Each stage is characterized by a certain separation factor for tritium so that the liquid leaving a given plate is a little more highly concentrated in tritium than the vapor which leaves the plate. By reason of the number of stages or plates necessary to obtain a water of low acidity, there is obtained overall a factor of about 1.5 between the tritium content of the 11N acid content and that of the water produced.

1,655 kilograms of $HNO_3$, the totality of the acid produced, and the major part of water, namely 4,630 kilograms, recovered at the head of the rectification column, are recycled into the Group I and Group II parts of the plant and serve for the preparation of the acid solutions necessary in the different units of the tritiated zone.

The proportion of tritium in the mixtures thus obtained depends on the acidity of the solution and is comprised between that of the recovered water (22 Ci per kilogram of hydrogen) and that of the 11N nitric acid solution (34 Ci per kg of hydrogen). These numbers determine the efficiency of tritium barriers which must be provided in the Group I and II parts of the plant.

Certain solution transfers must be made with the help of steam ejectors. It is calculated that 150 kilograms is the quantity of steam necessary to effect these transfers in the tritiated zone. To avoid an excess of supplementary water corresponding to this amount, this steam is taken off at the head of the rectification column 44 and is compressed at 53 to the desired pressure. In the drawing the utilization of tritiated steam has been indicated at a single point by means of a dash line arrow, inside of the tritiated zone. In reality however it is effected over the totality of this zone.

Lastly, part of the water is recycled in the Group III part of the plant as hereinabove described. The remainder, corresponding to an excess water amount of about 276 kilograms per ton uranium, is withdrawn as indicated at 51 from the plant and is stored or is sent to a separate plant for the treatment of tritiated water.

The quantity of excess water hereinabove indicated breaks down in the following way for one ton of uranium:

| | | |
|---|---|---|
| Reaction water formed in the course of dissolution of the fuel | 81 | kilograms |
| Addition of non-tritiated water: Washing in unit 20 | — | 100 kilograms |
| Water re-released by the solvent (units 15 to 23) | — | 10 kilograms (50–40) |
| Concentrate (line 35) | — | 85 kilograms |
| Total of non tritiated water: | 195 | 195 kilograms kilograms |
| Grand total: | 276 | kilograms |

This water is to a large extent freed from fission products with the help of means employed in the concentration and solidification units, and this constitutes an advantage for storage or, if necessary, for treatment of this effluent.

The quantity of tritium present in this excess water is of the order of 700 Ci at equilibrium, which value may be considered as being achieved after about five months of operation, taking into account a hold-up of 100 cubic meters of water in the tritiated zone.

The tritium concentration is established by these quantities at approximately 2.5 Ci per liter or about 22 Ci per kilogram of hydrogen. That is to say that to obtain a higher tritium concentration a still lower excess water quantity would be necessary.

In the present case it does not appear desirable to reduce further the excess water for the following reasons:

A. A higher tritium level entails the necessity for employing still more effective barrier means in the Group I and II parts of the plant, and B. The quantity of tritium accumulated might be much larger, which is a drawback for operation of the plant and involves an increased potential danger.

The foregoing computation shows the choice which can be made among the various possibilities to obtain a result optimally exploiting the conditions imposed by safety regulations for rejection of tritium to the environment and by the available economic and technical data, in order to isolate and to produce a tritiated effluent which can be stored or conveniently treated in a small volume, while avoiding accumulation of tritium in the plant.

While the invention has been described hereinabove in terms of the presently preferred embodiments and practice thereof, the invention itself is not limited thereto, but rather includes all modifications of and departures therefrom properly falling within the scope of the appended claims.

I claim:

1. A process for separating the components of spent irradiated nuclear fuel containing uranium, plutonium, tritium and fission products, which process comprises the steps of:
   a. shearing said fuel into fragments,
   b. dissolving the fragments in aqueous nitric acid to form an aqueous solution including tritium in the form of tritiated water,
   c. extracting the aqueous solution by a suitable organic solvent to yield an organic phase containing uranium, plutonium, a major portion of the fission products and tritiated water,
   d. washing said organic phase with a dilute aqueous solution of nitric acid to obtain an aqueous phase containing a major part of the tritiated water.
   e. submitting said organic phase to a second washing with a volume of dilute aqueous nitric acid free of tritium, said volume being appreciably smaller than that of the organic phase, thus removing substantially all the tritium from the organic phase while remain therein substantially all the uranium, plutonium and some residual fission products,
   f. extracting the tritium-free organic phase, simultaneously or separately, with an aqueous phase to yield an aqueous phase containing the uranium, plutonium and residual fission products,
   g. washing the organic phase first with aqueous sodium carbonate, then with alternating alkaline and acid aqueous solutions, thus rendering the organic phase suitable for recycling, and
   h. treating the several fractions containing the fission products for the purpose of concentrating at least the most active of such fractions and optionally solidifying them, thus also separating the tritiated water from the aqueous nitric acid, thereby making the nitric acid suitable for recycling.

2. A process according to claim 1, wherein the volume of dilute nitric acid solution free of tritium is from about 1/30th to about 1/300th of the volume of the organic phase.

3. A process according to claim 1, wherein the tritium is eliminated from the process in the excess of water, which is adjusted in proportion to the quantity of tritium, by rectification from the initiated nitric acid solutions.

4. A process according to claim 1, wherein the input of water is reduced by using anhydrous and/or concentrated reagents.

5. A process according to claim 4, wherein the input of water is reduced by introducing the nitric acid for the solution in the form of nitrous vapours which are absorbed in the tritiated water present.

6. A process according to claim 4, wherein the input of water is reduced by introducing the necessary nitric acid into the solution in a form concentrated by solvent extraction.

7. A process according to claim 1, wherein the carbonate-treated solution issuing from the first washing of the solvent is introduced with the effluents of other extraction cycles, the concentrate obtained being added to the effluents of the first extraction cycle.

8. A process according to claim 1, wherein the input of water is reduced by generating from recycled tritiated steam the steam necessary for operation of ejectors used in the transport of the tritiated solutions.

* * * * *